United States Patent
Tatsumi et al.

(10) Patent No.: US 8,792,204 B2
(45) Date of Patent: Jul. 29, 2014

(54) BASE PLATE OF MOTOR INCLUDING FLANGE PORTION AND PLASTIC DEFORMING PORTION AND DISK DRIVE APPARATUS

(71) Applicant: Nidec Corporation, Kyoto (JP)

(72) Inventors: Akio Tatsumi, Kyoto (JP); Takashi Fujiwara, Kyoto (JP); Takayuki Ishino, Kyoto (JP); Kiyofumi Inoue, Kyoto (JP); Akihiro Yudate, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/788,140

(22) Filed: Mar. 7, 2013

(65) Prior Publication Data

US 2013/0335859 A1   Dec. 19, 2013

Related U.S. Application Data

(60) Provisional application No. 61/662,432, filed on Jun. 21, 2012.

(30) Foreign Application Priority Data

Jun. 19, 2012   (JP) .................................. 2012-138070

(51) Int. Cl.
G11B 19/20   (2006.01)
G11B 33/12   (2006.01)

(52) U.S. Cl.
USPC .................... 360/98.07; 360/97.11; 360/99.08

(58) Field of Classification Search
USPC ....................... 360/98.07, 99.08, 97.11, 98.01
See application file for complete search history.

(56) References Cited

U.S. PATENT DOCUMENTS

| 7,012,191 B1 | 3/2006 | Watanabe et al. |
| 7,876,005 B2 * | 1/2011 | Ichizaki ...................... 310/67 R |
| 8,120,872 B2 | 2/2012 | Sekii et al. |

(Continued)

FOREIGN PATENT DOCUMENTS

| JP | 05-207717 A | 8/1993 |
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

Primary Examiner — Jefferson Evans
(74) Attorney, Agent, or Firm — Keating & Bennett, LLP

(57) ABSTRACT

A base plate of a disk drive apparatus includes a motor base disposed around a central axis and a base body portion extending radially outward of the motor base. The motor base is made of a metallic material of a first type. The base body portion is made of a metallic material of a second type. Thus, the axial thickness of a portion of the base plate close to the central axis can be significantly reduced and a reduction in the stiffness of the portion can be prevented. Further, the motor base includes a flange portion and a plastic deforming portion. The flange portion and the plastic deforming portion are respectively in contact with at least a portion of both axial end surfaces of an inner end portion of the base body portion. Thus, extraction of the motor base in the axial direction is prevented.

26 Claims, 12 Drawing Sheets

(56) References Cited

U.S. PATENT DOCUMENTS

| | | | |
|---|---|---|---|
| 8,334,625 B2 * | 12/2012 | Takaki et al. | 310/67 R |
| 8,363,352 B2 | 1/2013 | Kang | |
| 8,667,667 B1 | 3/2014 | Nguyen et al. | |
| 2004/0223255 A1 * | 11/2004 | Parsoneault et al. | 360/99.08 |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2008/0019038 A1 | 1/2008 | Xu et al. | |
| 2008/0084142 A1 | 4/2008 | Ino et al. | |
| 2010/0177627 A1 | 7/2010 | Ino et al. | |
| 2011/0235210 A1 * | 9/2011 | Himeno et al. | 360/99.08 |
| 2012/0200957 A1 | 8/2012 | Yawata | |
| 2013/0335860 A1 * | 12/2013 | Masumi et al. | 360/99.08 |
| 2013/0342934 A1 * | 12/2013 | Shiraishi et al. | 360/99.08 |

FOREIGN PATENT DOCUMENTS

| | | | |
|---|---|---|---|
| JP | 05-316704 A | 11/1993 | |
| JP | 06-343242 A | 12/1994 | |
| JP | 08-033253 A | 2/1996 | |
| JP | 08-237899 A | 9/1996 | |
| JP | 08-275439 A | 10/1996 | |
| JP | 10-108424 A | 4/1998 | |
| JP | 2003-153481 A | 5/2003 | |
| JP | 2005-253239 A | 9/2005 | |
| JP | 2007-295666 A | 11/2007 | |
| JP | 2008-005588 A | 1/2008 | |
| JP | 2008-092714 A | 4/2008 | |
| JP | 2009-110611 A | 5/2009 | |
| JP | 2011-114892 A | 6/2011 | |
| JP | 2012-005339 A | 1/2012 | |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tamaoka et al., "Motor and Disk Drive Apparatus", U.S. Appl. No. 13/564,900, filed Aug. 2, 2012.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al.,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

BASE PLATE OF MOTOR INCLUDING FLANGE PORTION AND PLASTIC DEFORMING PORTION AND DISK DRIVE APPARATUS

BACKGROUND OF THE INVENTION

1. Field of the Invention

The present invention relates to a base plate, a base unit, a motor, and a disk drive apparatus.

2. Description of the Related Art

Hitherto, a disk drive apparatus such as a hard disk drive has been known. A motor for rotating a disk is mounted in the disk drive apparatus. The conventional disk drive apparatus is disclosed, for example, in Japanese Patent Application Publication No. 2012-005339. The disk drive apparatus includes a base that supports all the components of the motor (see paragraph 0031 and FIG. 1 of Japanese Patent Application Publication No. 2012-005339).

In recent years, the demand for thin notebook PCs or tablet PCs has been increased. Accordingly, it is also necessary to make a disk drive apparatus mounted in such a PC thinner than the past. In order to make the disk drive apparatus thin, it is preferable to reduce the axial thickness of a base plate that supports the motor. In particular, motor components such as a stator and a hub should be arranged around a central axis of the motor. Thus, it is preferable to particularly reduce the axial thickness of the base plate in a lower side of the motor components.

However, if the axial thickness of the base plate is reduced, the stiffness of the base plate is weakened. If the stiffness of the base plate is weakened, vibration and noise due to driving of the motor are increased. Further, the position of the disk becomes unstable, and errors in reading and writing of data easily occur.

SUMMARY OF THE INVENTION

A first preferred embodiment of the present invention provides a base plate of a disk drive apparatus which rotates a disk around a central axis which extends vertically. The base plate includes a motor base and a base body portion. The motor base is disposed around the central axis and is made of a metallic material of a first type. The base body portion extends radially outward of the motor base and is made of a metallic material of a second type. A Young's modulus of the metallic material of the first type is larger than a Young's modulus of the metallic material of the second type. The motor base includes a bearing mounting portion, a bottom plate portion, a wall portion, a flange portion, and a plastic deforming portion. The bearing mounting portion preferably has a cylindrical or an approximately cylindrical shape which axially extends around the central axis. The bottom plate portion extends radially outward from a lower portion of the bearing mounting portion. The wall portion extends upward from an outer end portion of the bottom plate portion. The flange portion extends radially outward from one of an upper end and a lower end of the wall portion. The plastic deforming portion extends radially outward from the other of the upper end and the lower end of the wall portion. The base body portion includes an inner end portion which is in contact with an outer circumferential surface of the wall portion. The flange portion and the plastic deforming portion are respectively in contact with at least a portion of each of both axial end surfaces of the inner end portion of the base body portion.

A second preferred embodiment of the present invention provides a base plate of a disk drive apparatus which rotates a disk centered on a central axis which extends vertically. The base plate includes a motor base and a base body portion. The motor base is disposed around the central axis and is made of a metallic material of a first type. The base body portion extends radially outward of the motor base and is made of a metallic material of a second type. A Young's modulus of the metallic material of the first type is larger than a Young's modulus of the metallic material of the second type. The motor base includes a bearing mounting portion and a bottom plate portion. The bearing mounting portion preferably has a cylindrical or an approximately cylindrical shape which axially extends around the central axis. The bottom plate portion extends radially outward from a lower portion of the bearing mounting portion. The base body portion includes an edge portion which is radially in contact with an outer end portion of the motor base. The flange portion extends radially inward from one of an upper end and a lower end of the edge portion. The plastic deforming portion extends radially inward from the other of the upper end and the lower end of the edge portion. The flange portion and the plastic deforming portion are respectively in contact with at least a portion of both axial end surfaces of the outer end portion of the motor base.

According to the first and the second preferred embodiments of the present invention, the motor base that is disposed radially inside the base body portion is made of the metallic material of the first type having a Young's modulus larger than that of the metallic material of the second type that defines the base body portion. Thus, the axial thickness of the portion of the base plate, close to the central axis, can be significantly reduced and deterioration of the stiffness of the portion can be prevented. Further, extraction of the motor base in the axial direction can be prevented by the flange portion and the plastic deforming portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described referring to the accompanying drawings. In this description, a direction parallel to a central axis of a motor is referred to as an "axial direction", a direction orthogonal to the central axis of the motor is referred to as a "radial direction", and a direction along an arc around the central axis of the motor is referred to as a "circumferential direction", respectively.

Further, in this description, assuming that the axial direction is an up-and-down direction and the position of a stator with respect to a base plate is upward, the shapes and positional relationship of respective components will be described. Here, the definition of the vertical direction does not limit a direction when the base plate, a base unit, a motor, and a disk drive apparatus according to preferred embodiments of the present invention are manufactured or used.

Further, in this description, the phrase "parallel direction" includes both a parallel direction and a substantially parallel direction. Further, in this description, the phrase "orthogonal direction" includes both an orthogonal direction and a substantially orthogonal direction.

Figure 1:
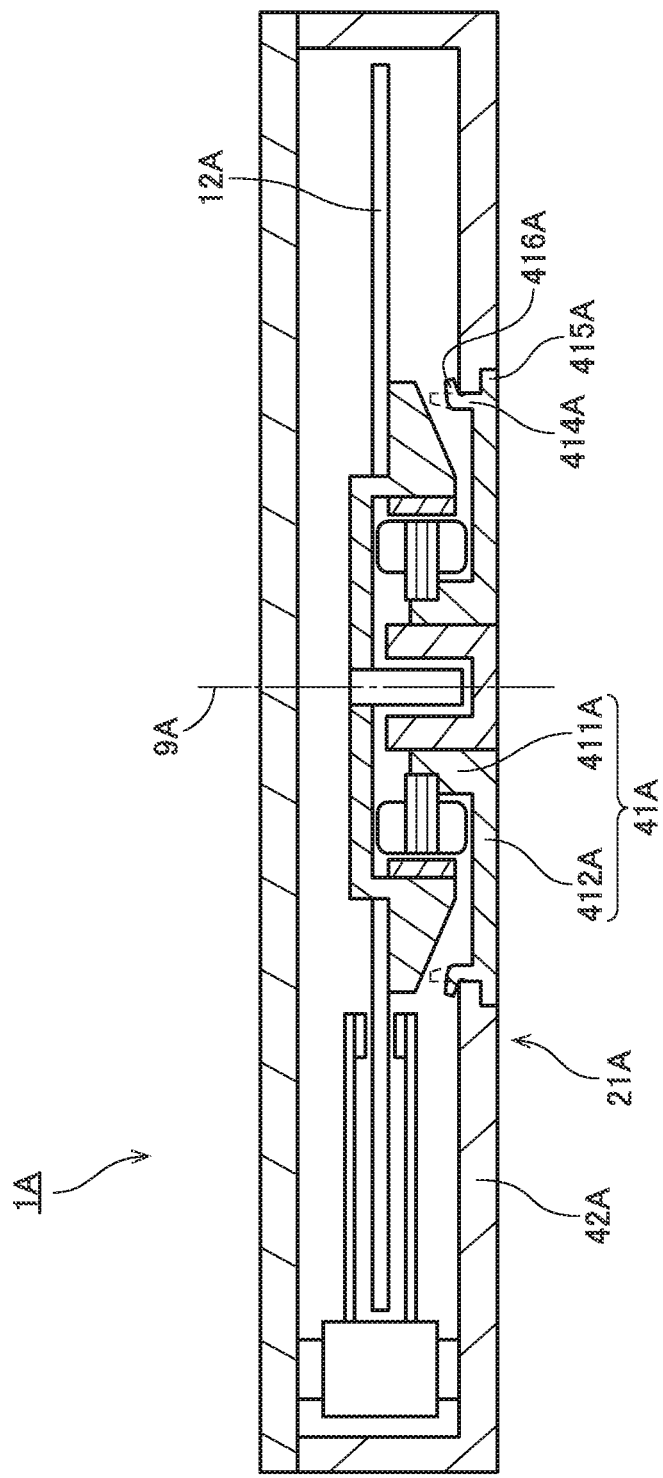
FIG. 1 is a longitudinal sectional view of a disk drive apparatus according to a first preferred embodiment of the present invention.

FIG. 1 is a longitudinal sectional view of a disk drive apparatus 1A according to a first preferred embodiment of the present invention. The disk drive apparatus 1A rotates a disk 12A around a central axis 9A that extends vertically. As shown in FIG. 1, a base plate 21A of the disk drive apparatus 1A preferably includes a motor base 41A and a base body portion 42A.

The motor base 41A is disposed around the central axis 9A. The motor base 41A preferably includes a bearing mounting portion 411A and a bottom plate portion 412A. The bearing mounting portion 411A axially extends in a cylindrical or an approximately cylindrical shape around the central axis 9A. The bottom plate portion 412A extends radially outward from a lower portion of the bearing mounting portion 411A. The base body portion 42A extends radially outward of the motor base 41A.

The motor base 41A is preferably made of a metallic material of a first type. The base body portion 42A is preferably made of a metallic material of a second type. The Young's modulus of the metallic material of the first type is larger than the Young's modulus of the metallic material of the second type. That is, in the base plate 21A, the motor base 41A disposed farther radially inward than the base body portion 42A is made of the metallic material of the first type having the Young's modulus larger than that of the metallic material of the second type that defines the base body portion 42A. Thus, the axial thickness of a portion in the vicinity of the central axis 9A of the base plate 21A can be significantly reduced and deterioration of the stiffness of the portion can be prevented.

Further, the motor base 41A of this preferred embodiment preferably further includes a wall portion 414A, a flange portion 415A, and a plastic deforming portion 416A. The wall portion 414A extends upward from an outer end portion of the bottom plate portion 412A. An outer circumferential surface of the wall portion 414A is in contact with an inner end portion of the base body portion 42A. The flange portion 415A extends radially outward from a lower end of the wall portion 414A. The flange portion 415A is in contact with at least a portion of a lower surface of the inner end portion of the base body portion 42A. The plastic deforming portion 416A extends radially outward from an upper end of the wall portion 414A. The plastic deforming portion 416A is in contact with at least a portion of an upper surface of the inner end portion of the base body portion 42A. Extraction of the motor base 41A in the axial direction is prevented by the flange portion 415A and the plastic deforming portion 416A.

The positions of the flange portion and the plastic deforming portion may alternatively be vertically reversed if so desired. That is, the flange portion may extend radially outward from the upper end of the wall portion. Further, the plastic deforming portion may extend radially outward from a lower end of the wall portion. In this case, the flange portion is in contact with at least a portion of the upper surface of the inner end portion of the base body portion. Further, the plastic deforming portion is in contact with at least a portion of the lower surface of the inner end portion of the base body portion.

Further, the flange portion and the plastic deforming portion may be provided in the base body portion. That is, the base body portion may include an edge portion that is in contact with an outer end portion of the motor base in the radial direction, and a flange portion and a plastic deforming portion that extend radially inward from the edge portion. In this case, the flange portion may extend radially inward from one of an upper end and a lower end of the edge portion while the plastic deforming portion may extend radially inward from the other of the upper end and the lower end of the edge portion. Further, the flange portion and the plastic deforming portion may be in contact with at least a portion of each of both axial end surfaces of the outer end portion of the motor base, respectively.

Figure 2:
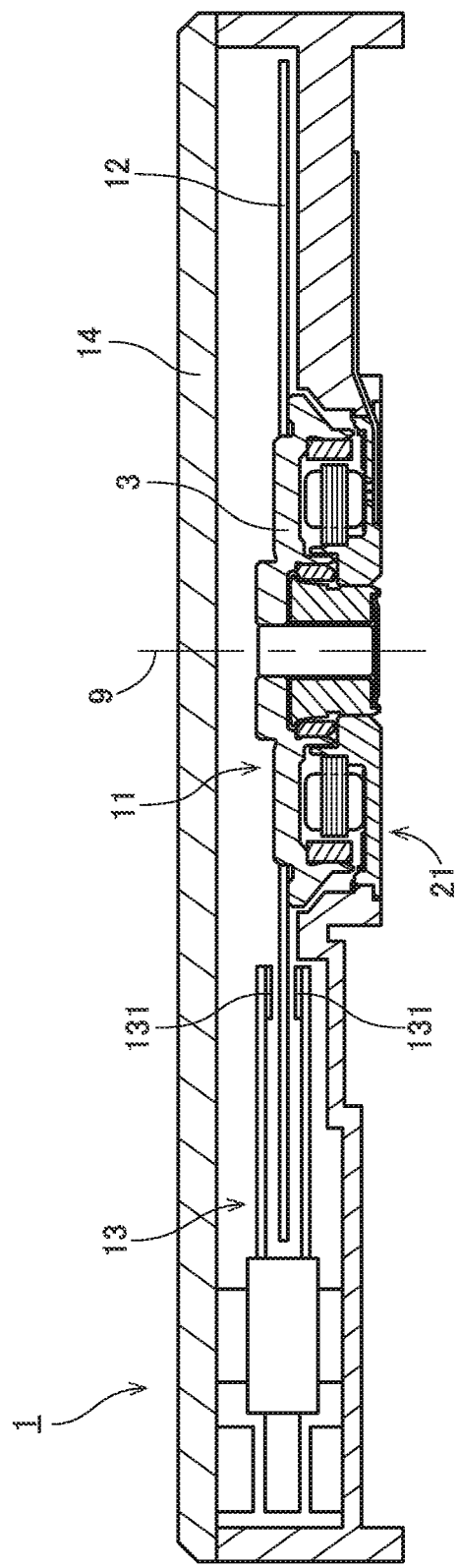
FIG. 2 is a longitudinal sectional view of a disk drive apparatus according to a second preferred embodiment of the present invention.

FIG. 2 is a longitudinal sectional view of a disk drive apparatus 1 according to a second preferred embodiment of the present invention. The disk drive apparatus 1 rotates a magnetic disk 12 to perform reading and/or writing of information from or to the magnetic disk 12. As shown in FIG. 2, the disk drive apparatus 1 preferably includes a motor 11, the magnetic disk 12, an access portion 13, and a cover 14.

The motor 11 supports the magnetic disk 12, and, at the same time, rotates the magnetic disk 12 centered on a central axis 9. The motor 11 preferably includes a base plate 21 that extends in a direction orthogonal to the central axis 9. Further, an upper portion of the base plate 21 is preferably covered by the cover 14. A rotating portion 3, the magnetic disk 12 and the access portion 13 of the motor 11 are accommodated inside a casing defined by the base plate 21 and the cover 14. The access portion 13 moves a head 131 along a recording surface of the magnetic disk 12 to perform reading and/or writing of information from or to the magnetic disk 12.

The disk drive apparatus 1 may include two or more magnetic disks 12, for example. Further, the access portion 13 may perform only one of reading and writing of information from or to the magnetic disk 12.

Figure 3:
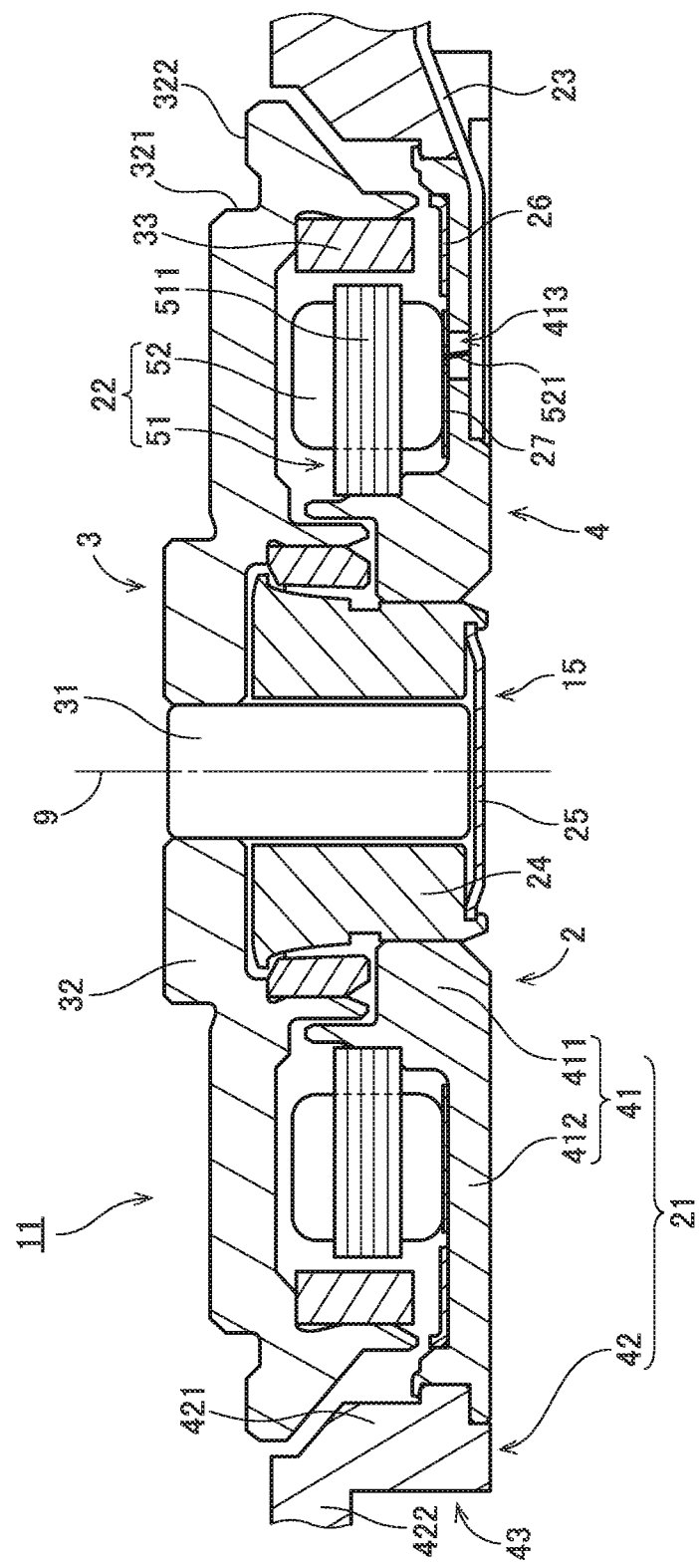
FIG. 3 is a longitudinal sectional view of a motor according to the second preferred embodiment of the present invention.

Subsequently, a detailed configuration of the motor 11 will be described. FIG. 3 is a longitudinal sectional view of the motor 11. As shown in FIG. 3, the motor 11 includes a stationary portion 2 and a rotating portion 3. The stationary portion 2 is relatively stationary with respect to the base plate 21. The rotating portion 3 is rotatably supported with respect to the stationary portion 2.

The stationary portion 2 of this preferred embodiment preferably includes the base plate 21, a stator 22, a circuit board 23, a sleeve 24, and a cap 25.

The base plate 21 extends in a direction orthogonal to the central axis 9 in the lower side of the rotating portion 3. The base plate 21 of the motor 11 is preferably defined by two components, which are a motor base 41 and a base body portion 42.

The motor base 41 has an annular shape which is disposed farther radially inward than the base body portion 42. The motor base 41 of this preferred embodiment is made of, for example, stainless steel which corresponds to a metallic material of a first type. As shown in FIG. 3, the motor base 41 preferably includes a bearing mounting portion 411 and an inner bottom plate portion 412. The bearing mounting portion 411 axially extends in a cylindrical or an approximately cylindrical shape around the central axis 9. The inner bottom plate portion 412 extends radially outward, in a circular or approximately circular plate shape, from a lower portion of the bearing mounting portion 411.

The base body portion 42 is disposed radially outside the motor base 41. The base body portion 42 of this preferred embodiment is preferably made of, for example, aluminum which is a metallic material of a second type. The base body portion 42 includes an inclined portion 421 and an outer bottom plate portion 422. The inclined portion 421 extends radially outward and upward in the radially outer side of the inner bottom plate portion 412. The outer bottom plate portion 422 extends radially outward from an outer end portion of the inclined portion 421.

The inner bottom plate portion 412 and the inclined portion 421 preferably define an accommodating portion 43 having an approximate cup shape which is opened upward. A stator 22 and a portion of the rotating portion 3 are accommodated in the accommodating portion 43. Thus, the outer bottom plate portion 422 is disposed at substantially the same vertical position as those of the stator 22 and the portion of the rotating portion 3. As a result, the total axial dimension of the disk drive apparatus 1, radially outside of the accommodating portion 43, is significantly reduced.

Further, a magnetic component 26 that is a magnetic body of an annular shape is preferably disposed on an upper surface of the inner bottom plate portion 412. The magnetic component 26 is disposed in the lower side of a magnet 33 which will be described later. An attractive magnetic force is generated between the magnetic component 26 and the magnet 33. Thus, the rotating portion 3 is attracted to the stationary portion 2.

The stator 22 preferably includes a stator core 51 and a plurality of coils 52. The stator core 51 is preferably defined by a laminated steel member in which electromagnetic steel plates such as, for example, silicon steel plates are laminated in the axial direction. The stator core 51 is fixed to an outer circumferential surface of the bearing mounting portion 411. Further, the stator core 51 includes a plurality of teeth 511 that protrude radially outward. The coils 52 are constituted by conducting wires wound around the respective teeth 511.

The stator core 51 and the coils 52 are disposed above the inner bottom plate portion 412. An insulating sheet 27 is interposed between the coils 52 and the inner bottom plate portion 412. Thus, the coils 52 and the motor base 41 are electrically insulated. Further, because the insulating sheet 27 is disposed therebetween, the inner bottom plate portion 412 and the coils 52 are able to be positioned close to each other in the axial direction. Thus, the axial thickness of the motor 11 is further reduced.

The coils 52 according to this preferred embodiment preferably include three conducting wires 521, respectively, arranged to supply each of three-phases of alternating current. An end portion of each conducting wire 521 that extends from the coils 52 reaches a lower surface of the inner bottom plate portion 412 through a drawing hole 413 defined in the inner bottom plate portion 412.

A circuit board 23 is preferably fixed to a lower surface of the base plate 21, for example, with an adhesive. An electric circuit arranged to supply a driving current to the coils 52 is mounted on the circuit board 23. The conducting wire 521 drawn from the drawing hole 413 is electrically connected to the electric circuit on the circuit board 23. The driving current of the motor 11 is supplied from an external power source to the coils 52 through the circuit board 23.

A flexible printed circuit board capable of easily being bent is preferably used as the circuit board 23 according to this preferred embodiment. If the flexible printed circuit board is used, the circuit board 23 may be disposed along concavities and convexities of the lower surface of the base plate 21. Further, if the flexible printed circuit board is used, the axial thickness of the circuit board 23 can be minimized. Accordingly, the axial thickness of the motor 11 can further be reduced.

In this preferred embodiment, the base unit 4 is preferably defined by the base plate 21, the stator 22, and the circuit board 23.

A sleeve 24 axially extends in a cylindrical or an approximately cylindrical shape around a shaft 31 which will be described later. A lower portion of the sleeve 24 is accommodated radially inside the bearing mounting portion 411, and is fixed to the bearing mounting portion 411, for example, with an adhesive. An inner circumferential surface of the sleeve 24 radially faces an outer circumferential surface of the shaft 31. Further, a lower opening of the sleeve 24 is blocked by a cap 25.

The rotating portion 3 according to this preferred embodiment preferably includes the shaft 31, a hub 32, and the magnet 33.

The shaft 31 axially extends in the inner side of the sleeve 24. Metal such as, for example, stainless steel, is preferably used as a material of the shaft 31. An upper end portion of the shaft 31 protrudes farther upward from the upper surface of the sleeve 24. Further, a lubricating fluid is interposed between the sleeve 24 and the cap 25, and the shaft 31. For example, a polyol ester-based oil or a diester-based oil may preferably be used as the lubricating fluid. The shaft 31 is rotatably supported, through the intermediary of the lubricating fluid, with respect to the sleeve 24 and the cap 25.

That is, in this preferred embodiment, a bearing mechanism 15 is preferably defined by the sleeve 24 and the cap 25 that are components of the stationary portion 2, the shaft 31 that is a component of the rotating portion 3, and the lubricating fluid interposed therebetween. The bearing mechanism 15 is accommodated in the bearing mounting portion 411. The rotating portion 3 is supported by the bearing mechanism 15 and rotates centered on the central axis 9.

The hub 32 extends radially outward from a circumferential portion of the upper end portion of the shaft 31. An inner circumferential portion of the hub 32 is fixed to the upper end portion of the shaft 31. Further, the hub 32 preferably includes a first holding surface 321 of a cylindrical or an approximately cylindrical shape, and a second holding surface 322 that extends radially outward from a lower end portion of the first holding surface 321. The inner circumferential portion of the magnetic disk 12 is in contact with at least a portion of the first holding surface 321. Further, a lower surface of the magnetic disk 12 is in contact with at least a portion of the second holding surface 322. Thus, the magnetic disk 12 is held.

The magnet 33 is fixed to the hub 32 in the radially outer side of the stator 22. The magnet 33 of this preferred embodiment preferably has an annular shape. An inner circumferential surface of the magnet 33 radially faces end surfaces of the radially outer side of a plurality of teeth 511. Further, the N poles and the S poles are alternately magnetized in the circumferential direction in the inner circumferential surface of the magnet 33.

A plurality of magnets may alternatively be used instead of the annular magnet 33. In a case where the plurality of magnets is used, the plurality of magnets may be arranged in the circumferential direction so that the N pole and the S pole are alternately arranged.

In the above-described motor 11, if a driving current is supplied to the coils 52 through the circuit board 23, a magnetic flux is generated in the plurality of teeth 511. Further, a circumferential torque is generated due to an action of the magnetic flux between the teeth 511 and the magnet 33. Consequently, the rotating portion 3 rotates centered on the central axis 9 with respect to the stationary portion 2. The magnetic disk 12 supported by the hub 32 rotates centered on the central axis 9 together with the rotating portion 3.

Figure 4:
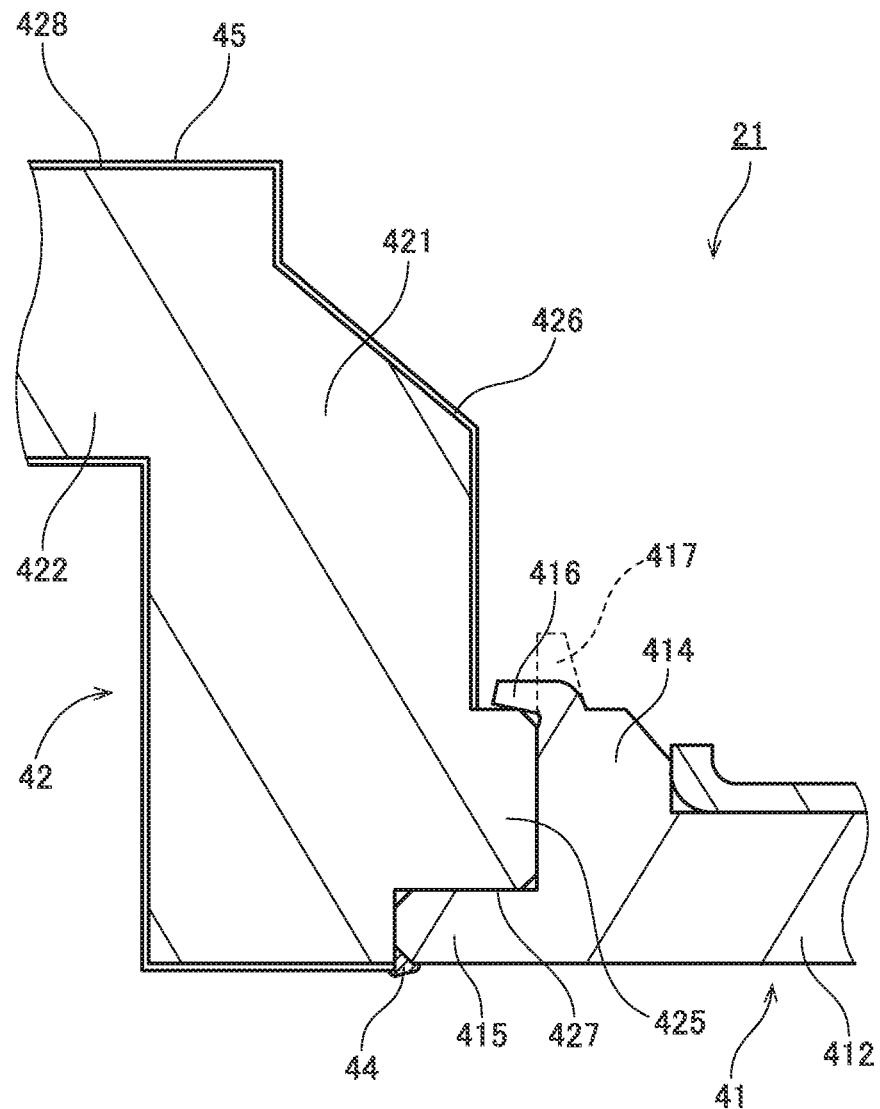
FIG. 4 is a partial longitudinal sectional view of a base plate according to the second preferred embodiment of the present invention.

FIG. 4 is a partial longitudinal sectional view of the base plate 21 in the vicinity of a boundary between the motor base 41 and the base body portion 42. Hereinafter, a detailed structure of the base plate 21 will be described referring to FIGS. 3 and 4.

The motor base 41 is preferably obtained by, for example, cutting stainless steel that is a metallic material of a first type. A ferromagnetic stainless steel, a non-magnetic stainless steel, or the like may be used as a material of the motor base 41, for example. Specifically, an austenitic stainless steel such as SUS 303 or SUS 304, a martensitic stainless steel such as SUS 420, or a ferritic stainless steel such as SUS 430 may preferably be used. Here, as the material of the motor base 41, a different type of stainless steel may be used, or iron may be used. Further, the material of the motor base 41 may be a magnetic metal or a non-magnetic metal. Further, the motor base 41 may be formed by a process other than the cutting such as, for example, press working, forging, etc. In addition, in a case where the motor base is made of a ferromagnetic stainless steel, the magnetic component 26 may not be provided.

The base body portion 42 is preferably obtained by casting of aluminum that is a metallic material of a second type. Here, magnesium or magnesium alloy may alternatively be used as the material of the base body portion 42 instead of the aluminum. Further, the base body portion 42 may be formed by a process other than the casting such as, for example, press working, forging, etc. The meaning of "aluminum" in this description includes both of pure aluminum and also any aluminum alloy suitable for casting.

The motor base 41 is disposed farther radially inward than the base body portion 42. Further, the Young's modulus of stainless steel that provides the motor base 41 is larger than the Young's modulus of aluminum that provides the base body portion 42. Thus, the axial thickness of the motor base 41, that is, of a portion close to the central axis 9 of the base plate 21 can be significantly reduced, and deterioration of the stiffness of the portion can be prevented. Accordingly, the motor 11 can be made thinner in the axial direction.

If the stiffness of the motor base 41 can be secured, vibrations or noise caused due to the driving of the motor 11 can be significantly reduced and prevented. Further, since the position of the magnetic disk 12 is stabilized, errors in reading and writing of data will hardly ever occur.

As shown in FIG. 3, in this preferred embodiment, the inner end portion of the inner bottom plate portion 412 is disposed farther radially inward than the inner end portion of the coils 52. Further, the outer end portion of the inner bottom plate portion 412 is disposed farther radially outward than the outer end portion of the coils 52. Accordingly, the inner bottom plate portion 412 is arranged below the coils 52. The stiffness of the inner bottom plate portion 412 which is made of stainless steel is only barely reduced even though the inner bottom plate portion 412 has been made thin in the axial direction. Thus, by reducing the thickness of the inner bottom plate portion 412, a space where the coils 52 are arranged can be secured, and the stiffness necessary for the inner bottom plate portion 412 can be obtained. Further, by reducing the thickness of the inner bottom plate portion 412, the number of turns of the coils 52 can be increased. As the number of turns of the coils 52 increases, an output of the motor 11 increases.

Further, as shown in FIG. 4, the motor base 41 of this preferred embodiment preferably includes a wall portion 414, a flange portion 415, and a plastic deforming portion 416. The wall portion 414 extends upward, in a cylindrical or an approximately cylindrical shape, from the radially outer end portion of the inner bottom plate portion 412. An outer circumferential surface of the wall portion 414 and the radially inner end portion of the base body portion 42 are at least partially in contact with each other.

The flange portion 415 extends radially outward from a lower end of the wall portion 414. The flange portion 415 may either be continuously connected in an annular shape around the wall portion 414 or partially disconnected. An upper surface of the flange portion 415 is in contact with at least a portion of a lower surface of the inner end portion of the base body portion 42.

The plastic deforming portion 416 extends radially outward from an upper end of the wall portion 414. That is, in this preferred embodiment of the present invention, the plastic deforming portion 416 is disposed higher than the flange portion 415. The plastic deforming portion 416 is preferably obtained by, for example, crimping, that is, plastically deforming a head portion 417, which extends upward from an upper end portion of the wall portion 414, radially outward. In FIG. 4, the head portion 417 before plastic deformation is indicated by a broken line. In manufacturing the base plate 21, firstly, the motor base 41 is preferably inserted, from the lower side thereof, into a hole which is in a radially inner side of the base body portion 42. Further, by, for example, crimping the head portion 417 radially outward, the plastic deforming portion 416 is defined.

A lower surface of the plastic deforming portion 416 is in contact with at least a portion of an upper surface of the inner end portion of the base body portion 42. Here, the plastic deforming portion 416 may be in contact with only an edge portion of a radially inner side of the upper surface of the inner end portion of the base body portion 42. Further, the contact of the plastic deforming portion 416 and the base body portion 42 may be surface contact, and may also be line contact or point contact.

In this way, the radially inner end portion 425 of the base body portion 42 is wedged between the flange portion 415 and the plastic deforming portion 416 in the axial direction. By doing this, the motor base 41 is axially positioned with respect to the base body portion 42. Further, extraction of the motor base 41 in the axial direction is prevented.

Further, in this preferred embodiment of the present invention, the flange portion 415 and the plastic deforming portion 416 are preferably provided in the motor base 41, instead of the base body portion 42. By doing this, a thin portion such as a flange portion or a plastic deforming portion need not be provided in the base body portion 42, which is preferably a casting product. Accordingly, the base body portion 42 can easily be cast with high accuracy. Further, in this preferred embodiment, the plastic deforming portion 416 preferably is formed by, for example, crimping the head portion 417 radially outward. Thus, the plastic deforming portion 416 can easily be formed, compared with, for example, a case where the head portion is crimped radially inward.

The plastic deforming portion 416 may be continuously connected in an annular shape, or a plurality of plastic deforming portions may be arranged in the circumferential direction at intervals. If the plastic deforming portion 416 is continuously connected in an annular shape, a fixing strength of the motor base 41 with respect to the base body portion 42 is increased. On the other hand, if a plurality of plastic deforming portions are arranged in the circumferential direction at intervals, a pressure applied when each plastic deforming portion 416 is crimped is reduced.

As shown in FIG. 4, the surface of the base body portion 42 preferably includes a coated surface 426 coated by an insulating layer 45 and an exposed surface 427 exposed from the insulating layer 45. The insulating layer 45 is preferably formed by electro-deposition, for example. In this preferred embodiment, both axial end surfaces and the inner circumferential surface of the inner end portion of the base body portion 42 are the exposed surfaces 427. When manufacturing the base body portion 42, firstly, the insulating layer 45 is preferably formed by electro-deposition on the entire surface of the base body portion 42 after casting. Then, both axial end surfaces and the inner circumferential surface of the inner end portion of the base body portion 42 are cut. By doing this, the exposed surface 427 is formed. In addition, the insulating layer 45 may be formed, for example, by plating or the like if so desired.

The exposed surface 427 is preferably finished with higher accuracy, compared with the surface of the insulating layer 45. Further, the outer circumferential surface of the wall portion 414, the upper surface of the flange portion 415, and the lower surface of the plastic deforming portion 416 are respectively in contact with the exposed surface 427. Thus, the motor base 41 is fixed with higher accuracy with respect to the base body portion 42. Further, the insulating layer is free from being damaged due to the pressure during the crimping process. Accordingly, an occurrence of dust due to the insulating layer is significantly reduced and prevented.

The base body portion 42 may further include the exposed surface 427, besides both axial end surfaces and the inner circumferential surface of the inner end portion.

Further, as shown in FIG. 4, the base body portion 42 of this preferred embodiment preferably includes an outer upper surface 428 disposed farther radially outward than the plastic deforming portion 416. The upper surface of the plastic deforming portion 416 is preferably disposed lower than the outer upper surface 428. Thus, the plastic deforming portion 416 is reduced from being in contact with a member such as the hub 32 that rotates in the disk drive apparatus 1, for example.

Further, as shown in FIG. 3, the motor base 41 of this preferred embodiment preferably includes the drawing hole 413. The drawing hole 413 axially penetrates through the inner bottom plate portion 412. The conducting wire 521 that extends from the coils 52 preferably reaches a lower surface of the motor base 41 through the drawing hole 413. Particularly, in this preferred embodiment, the drawing hole 413 is provided in the motor base 41 made of stainless steel, instead of the base body portion 42 made of aluminum. Thus, deterioration of the stiffness due to the drawing hole 413 is significantly reduced and prevented.

Further, if the drawing hole is provided in the base body portion 42, the length of the conducting wire 521 from the coils 52 to the drawing hole is increased. In this preferred embodiment, by providing the drawing hole 413 in the inner bottom plate portion 412 of the motor base 41, the length of the conducting wire 521 from the coils 52 to the drawing hole 413 is reduced.

Further, as shown in FIG. 4, in this preferred embodiment, an adhesive 44 that is preferably a sealing material is disposed in a boundary portion between the lower surface of the motor base 41 and the lower surface of the base body portion 42. It is preferable that the adhesive 44 be continuously connected in an annular shape without a gap. Inflow and outflow of gas in the boundary between the motor base 41 and the base body portion 42 is preferably further reduced by the adhesive 44. As a result, air tightness of the disk drive apparatus 1 is further improved. Further, a different sealing material may alternatively be used instead of the adhesive 44. For example, a resin material other than the adhesive, or an adhesive sheet may be used as the sealing material.

Hereinafter, various modified preferred embodiments of the present invention will be described focusing on various differences with respect to the second preferred embodiment of the present invention.

Figure 5:
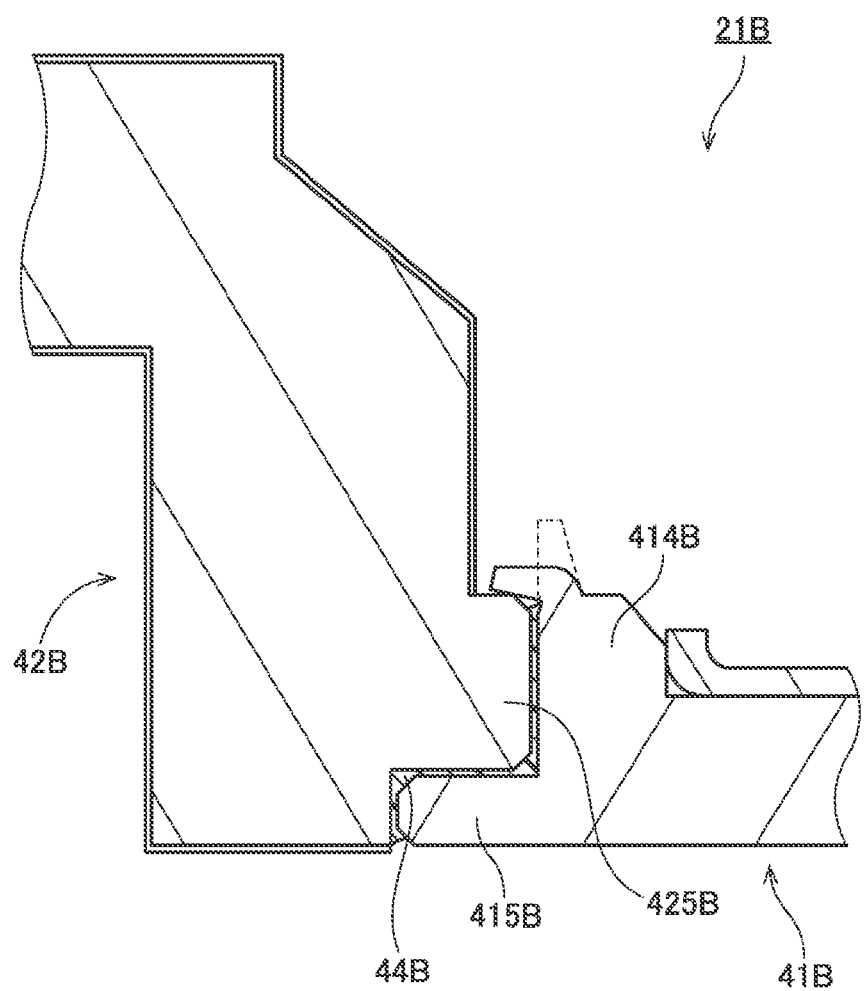
FIG. 5 is a partial longitudinal sectional view of a base plate according to a modified preferred embodiment of the present invention.

FIG. 5 is a partial longitudinal sectional view of a base plate 21B according to a modified preferred embodiment of the present invention. In FIG. 5, an adhesive 44B that is a sealing material is preferably interposed between a motor base 41B and a base body portion 42B. Specifically, the adhesive 44B is preferably interposed over the entire circumference between a wall portion 414B and a flange portion 415B, and also between an inner end portion 425B of the base body portion 42B. By doing this, inflow and outflow of gas in the boundary between the motor base 41B and the base body portion 42B is further reduced. As a result, air tightness of the disk drive apparatus is further improved.

Figure 6:
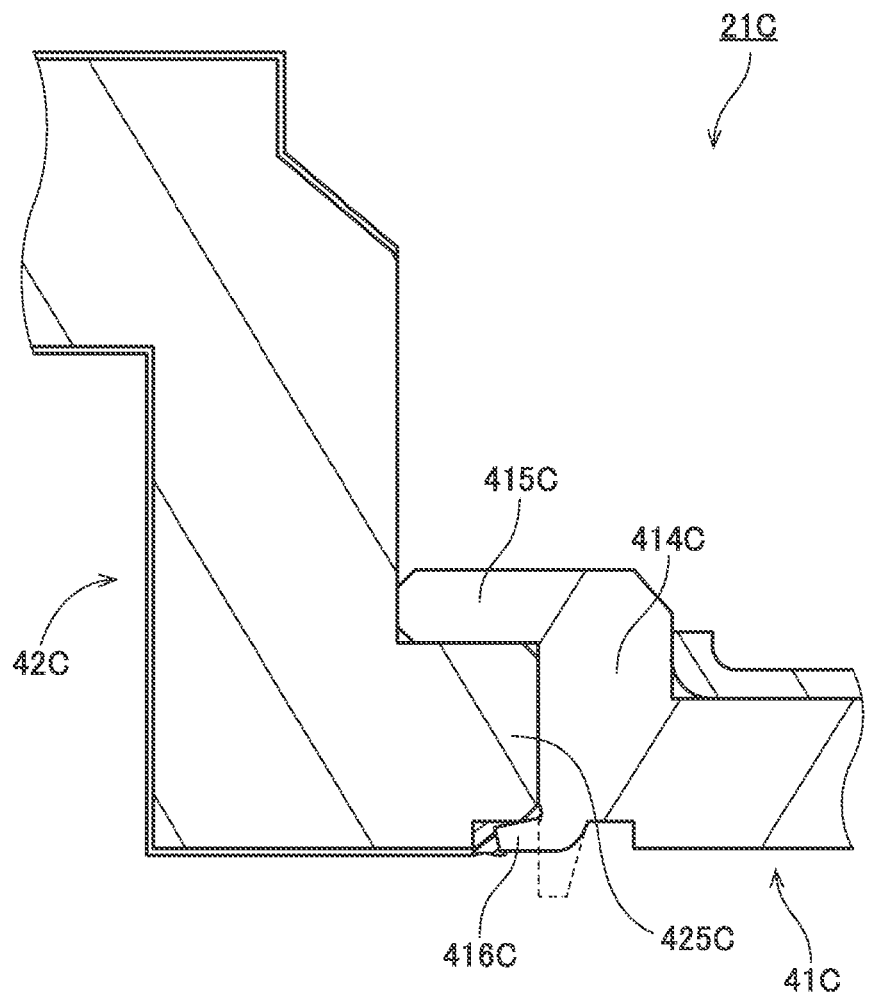
FIG. 6 is a partial longitudinal sectional view of a base plate according to a modified preferred embodiment of the present invention.

FIG. 6 is a partial longitudinal sectional view of a base plate 21C according to another modified preferred embodiment of the present invention. In FIG. 6, a flange portion 415C preferably extends radially outward from an upper end of a wall portion 414C and a plastic deforming portion 416C extends radially outward from a lower end of the wall portion 414C. That is, in the preferred embodiment of FIG. 6, the plastic deforming portion 416C is disposed lower than the flange portion 415C. By doing this, the plastic deforming portion 416C is exposed to an external space of the disk drive apparatus. Accordingly, the plastic deforming portion 416C is free from being in contact with the member such as a hub that rotates in the disk drive apparatus.

Further, in the preferred embodiment of FIG. 6, a radially inner end portion 425C of the base body portion 42C is wedged between the flange portion 415C and the plastic deforming portion 416C in the axial direction. By doing this, the motor base 41C is axially positioned with respect to the base body portion 42C. Further, extraction of the motor base 41C in the axial direction is prevented.

Figure 7:
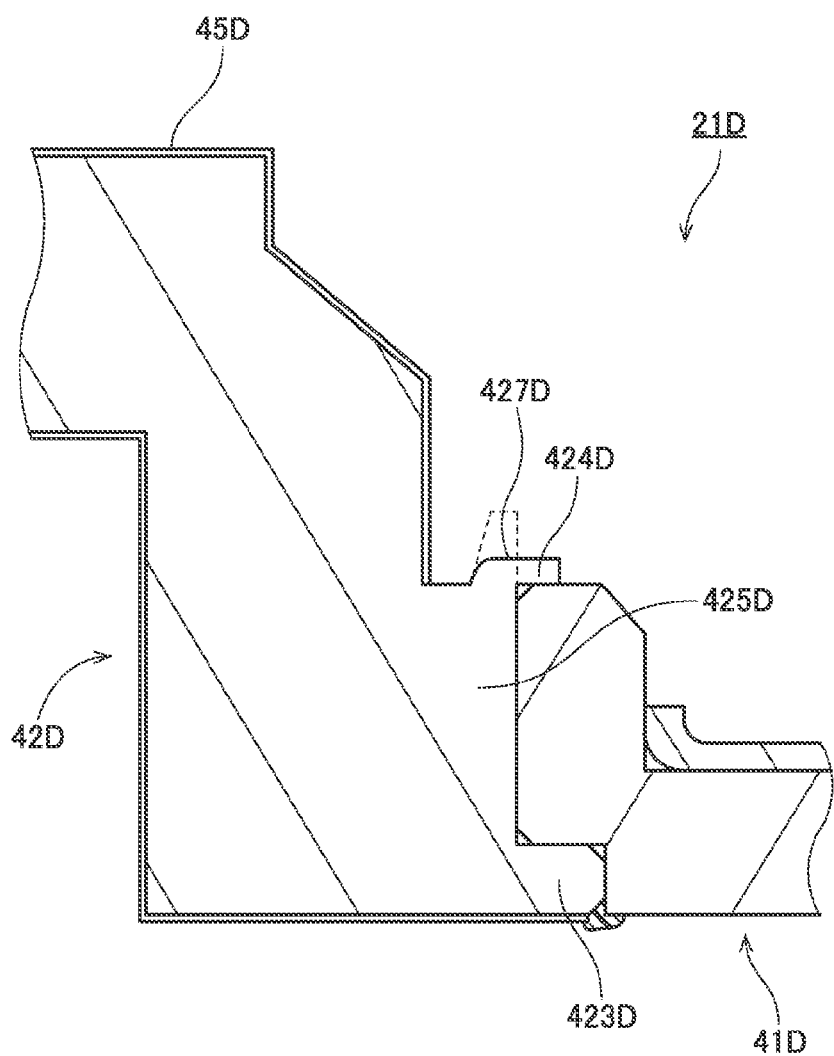
FIG. 7 is a partial longitudinal sectional view of a base plate according to a modified preferred embodiment of the present invention.

FIG. 7 is a partial longitudinal sectional view of a base plate 21D according to yet another modified preferred embodiment of the present invention. In FIG. 7, a flange portion and a plastic deforming portion are preferably not provided in the motor base 41D. Further, a base body portion 42D preferably includes an edge portion 425D, a flange portion 423D, and a plastic deforming portion 424D. The edge portion 425D surrounds an outer end portion of the motor base 41D in an annular shape. An inner circumferential surface of the edge portion 425D is radially in contact with at least a portion of an outer end portion of the motor base 41D.

The flange portion 423D extends radially inward from a lower end of the edge portion 425D. The plastic deforming portion 424D extends radially inward from an upper end of the edge portion 425D. That is, in the preferred embodiment of FIG. 7, the plastic deforming portion 424D is disposed higher than the flange portion 423D.

An upper surface of the flange portion 423D is in contact with at least a portion of a lower surface of an outer end portion of the motor base 41D. Further, a lower surface of the plastic deforming portion 424D is in contact with at least a portion of an upper surface of the outer end portion of the motor base 41D. Here, the plastic deforming portion 424D may be in contact with only an edge portion of the radially outer side of the upper surface of the inner end portion of the motor base 41D. Further, the contact of the plastic deforming portion 424D and the motor base 41D may be surface contact, and may be line contact or point contact.

In this way, in the preferred embodiment of FIG. 7, the outer end portion of the motor base 41D is preferably wedged between the flange portion 423D and the plastic deforming portion 424D in the axial direction. Thus, the motor base 41D is axially positioned with respect to the base body portion 42D. Further, extraction of the motor base 41D in the axial direction is prevented.

Further, in the preferred embodiment of FIG. 7, it is preferable that at least a surface of the plastic deforming portion 424D be an exposed surface 427D that is exposed from an insulating layer 45D. If the surface of the plastic deforming portion 424D is provided as the exposed surface 427D, the insulating layer 45D is free from being damaged due to the pressure during the crimping process. Accordingly, occurrence of dust due to the insulating layer 45D is significantly reduced and prevented. Further, it is more preferable that the lower surface of the plastic deforming portion 424D, the inner circumferential surface of the edge portion 425D, and the upper surface of the flange portion 423D be provided as the exposed surface 427D. Then, the motor base 41 can be fixed with respect to the base body portion 42 with higher accuracy.

Figure 8:
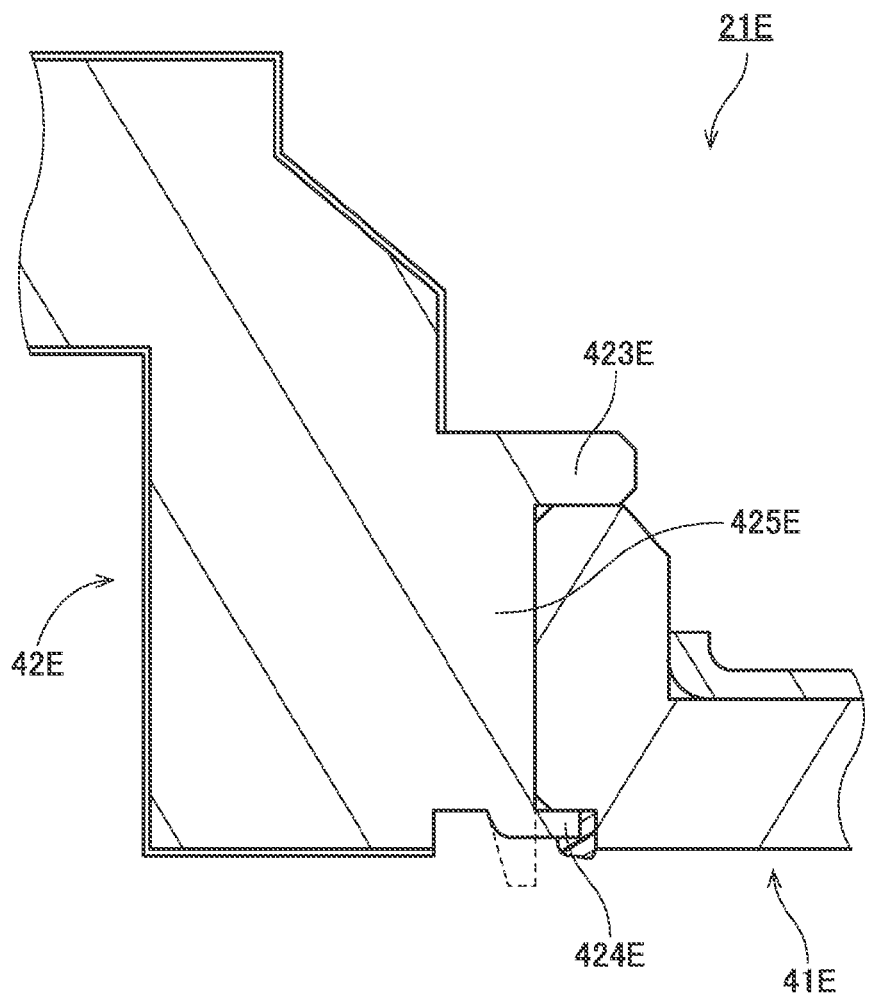
FIG. 8 is a partial longitudinal sectional view of a base plate according to a modified preferred embodiment of the present invention.

FIG. 8 is a partial longitudinal sectional view of a base plate 21E according to yet another modified preferred embodiment of the present invention. In FIG. 8, a flange portion 423E preferably extends radially inward from an upper end of an edge portion 425E of a base body portion 42E while a plastic deforming portion 424E extends radially inward from a lower end of the upper end of the edge portion 425E of the base body portion 42E. That is, in the preferred embodiment of FIG. 8, the plastic deforming portion 424E is disposed lower than the flange portion 423E. By doing this, the plastic deforming portion 424E is exposed to an external space of the disk drive apparatus. Accordingly, the plastic deforming portion 424E is free from being in contact with a component such as a hub that rotates in the disk drive apparatus.

Further, in the preferred embodiment of FIG. 8, an outer end portion of a motor base 41E is wedged between the flange portion 423E and the plastic deforming portion 424E in the axial direction. Thus, the motor base 41E is axially positioned with respect to the base body portion 42E. Further, extraction of the motor base 41E in the axial direction is prevented.

Further, in the preferred embodiments of FIG. 7 and FIG. 8, the plastic deforming portion is preferably provided in the base body portion made of aluminum, instead of the motor base made of stainless steel. Thus, the plastic deforming portion can easily be deformed. Further, a complicated concavo-convex shape including the flange portion and the plastic deforming portion need not be provided in the motor base, which is preferably, for example, a cutting product. Accordingly, the motor base can easily be manufactured.

Figure 9:
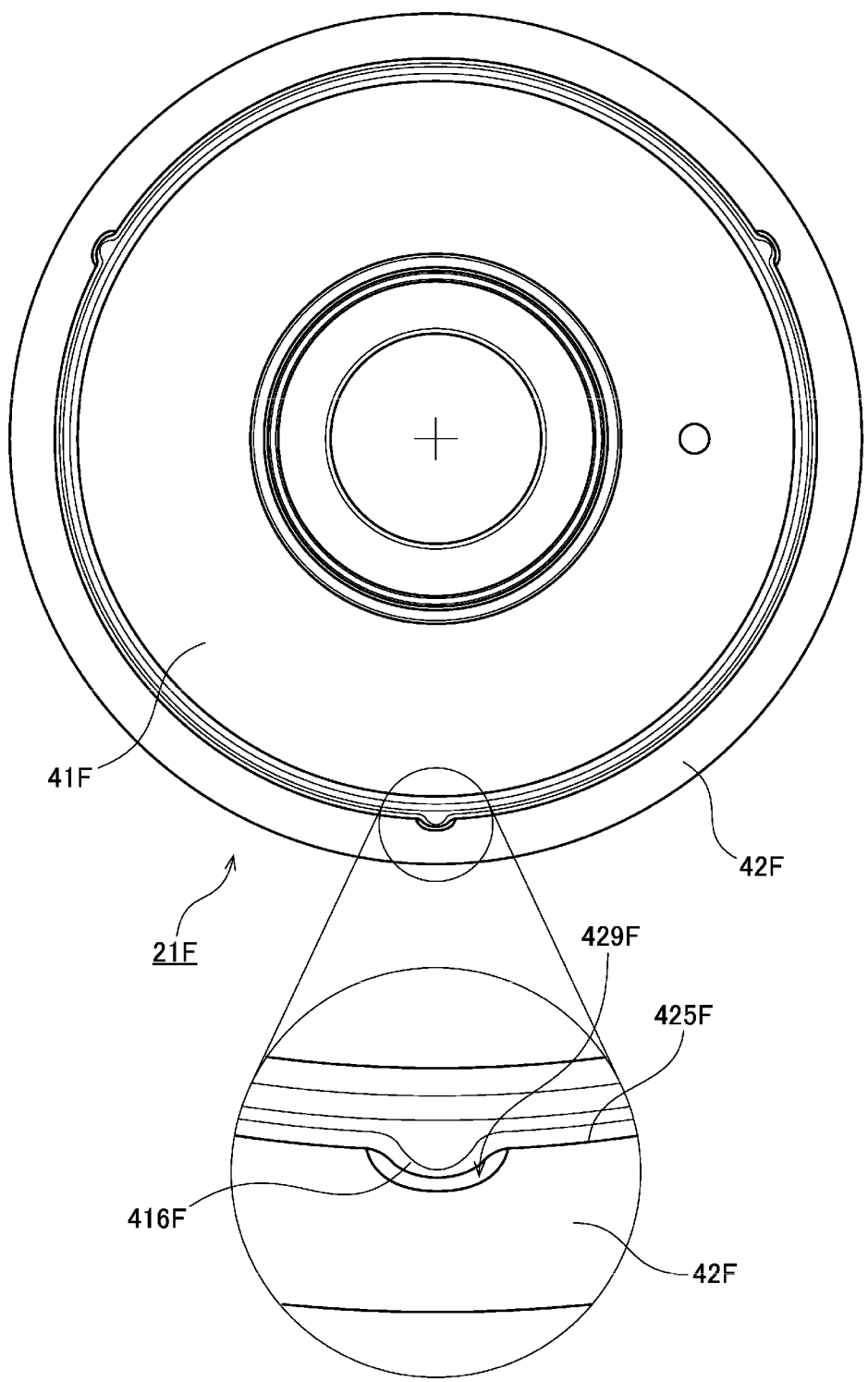
FIG. 9 is a partial top view of a base plate according to a modified preferred embodiment of the present invention.

FIG. 9 is a partial top view of a base plate 21F according to yet another modified preferred embodiment of the present invention. In FIG. 9, a plurality of cut outs 429F are preferably provided in a base body portion 42F. Each cut out 429F extends radially outward from an inner end portion 425F of the base body portion 42F. Further, a plastic deforming portion 416F of a motor base 41F is plastically deformed to be fit into the cut out 429F. That is, in the preferred embodiment of FIG. 9, at least a portion of the plastic deforming portion 416F is disposed inside the cut out 429F. Thus, circumferential rotation of the motor base 41F with respect to the base body portion 42F can be prevented by the plastic deforming portion 416F and the cut out 429F.

The plastic deforming portion may alternatively be provided in the base body portion, and the plurality of cut outs may be provided in the motor base. In this case, each cut out extends radially inward from the outer end portion of the motor base. If at least a portion of the plastic deforming portion of the base body portion is disposed inside the cut out, circumferential rotation of the motor base with respect to the base body portion can be prevented.

Figure 10:
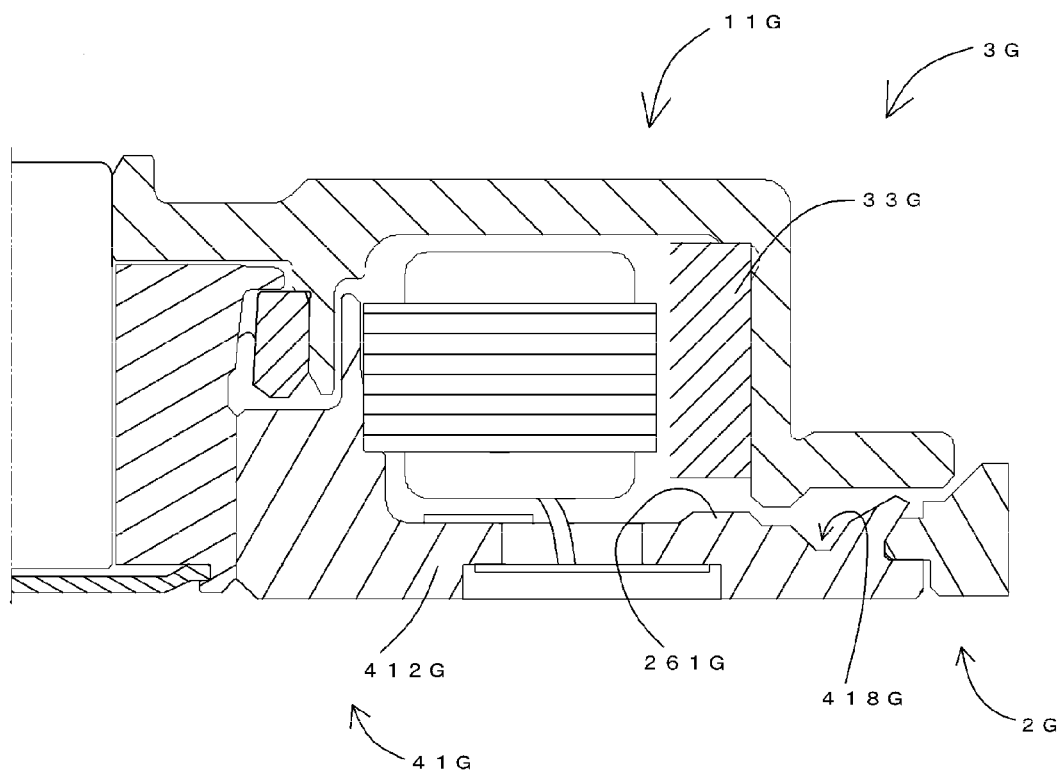
FIG. 10 is a partial longitudinal sectional view of a base plate according to a modified preferred embodiment of the present invention.

In the above-described preferred embodiments of the present invention and modifications thereof, a case where the motor base is preferably made of a non-magnetic material has been described; however, the motor base may alternatively be made of a magnetic material. In a case where the motor base is made of the magnetic material, a magnetic attractive force is generated between the motor base and the magnet. Thus, even in a case where the rotating portion is attracted to the stationary portion and a shock or the like is applied to the motor from the outside, the rotating portion is prevented from being relatively separated from the stationary portion in the axial direction. Referring to FIG. 10, a case where the motor base is made of the magnetic material will be described. Further, in the following description, the magnetic attractive force generated between the motor base and the magnet is simply referred to as a magnetic attractive force.

FIG. 10 is a partial sectional view of a motor 11G according to another preferred embodiment of the present invention. In FIG. 10, a convex portion 261G is disposed on an upper surface of an inner bottom plate portion 412G. The convex portion 261G is preferably disposed under a magnet 33G.

In order to generate a sufficient magnetic attractive force to attract the rotating portion 3G toward the stationary portion 2G, the axial distance between a motor base 41G and the magnet 33G should be shortened to a distance where the sufficient magnetic attractive force is generated. However, if the axial distance between the motor base 41G and the magnet 33G is shortened, a space where a stator 22G is accommodated becomes small. Accordingly, the stator 22G should be made small, and thus, there is a concern that the motor 11G will not be able to obtain sufficient torque with a small stator.

Thus, as shown in FIG. 10, if the convex portion 261G that protrudes toward the magnet 33G is disposed on the upper surface of the inner bottom plate portion 412G, the axial distance between the upper surface of the convex portion 261G and the magnet 33G can be shortened. By doing this, a sufficient magnetic attractive force can be obtained, and at the same time, a sufficient space arranged to accommodate the stator 22G can be secured.

Figure 11:
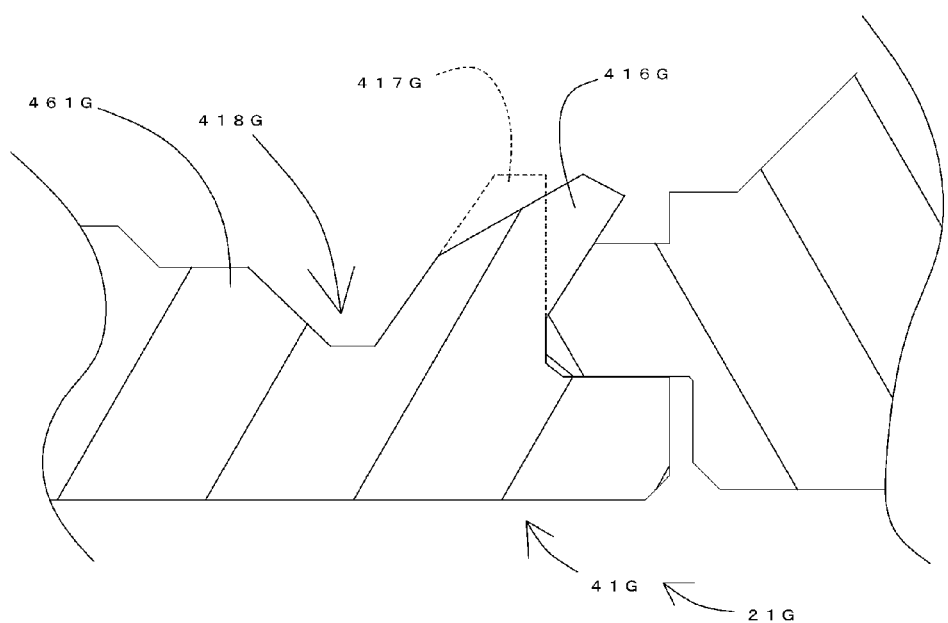
FIG. 11 is a partial longitudinal sectional view of a base plate according to a modified preferred embodiment of the present invention.

FIG. 11 is a partial sectional view of a base plate 21G according to another modified preferred embodiment of the present invention. In FIG. 11, a motor base 41G preferably includes a concave portion 418G at a radially inner side of a plastic deforming portion 416G. As shown in FIG. 4, in a case where the concave portion 418G is not provided, a base portion of a head portion 417G is pulled radially outward when the head portion 417G is crimped. Thus, there is a concern that an upper surface of the inner bottom plate portion 461G may be deformed. If the concave portion 418G is provided in the base portion of the head portion 417G, the portion pulled radially outward during the crimping can diminish. Thus, deformation of the inner bottom plate portion 461G generated when the head portion 417G is crimped can be reduced.

A plurality of the concave portions 418G may be provided in the base portion of the head portion 417G. Further, the concave portion 418G may be continuously connected in an annular shape.

Figure 12:
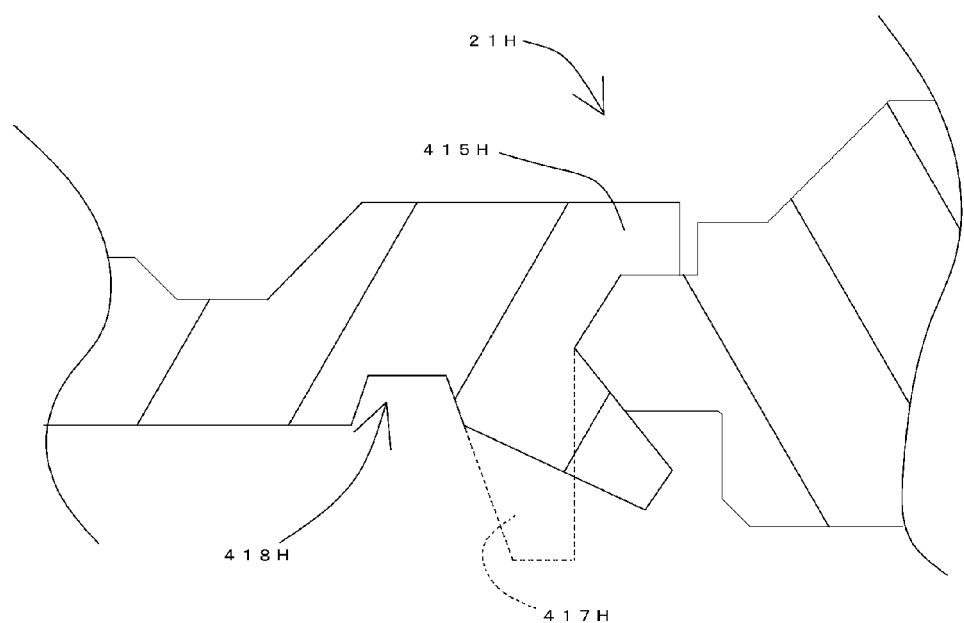
FIG. 12 is a partial longitudinal sectional view of a base plate according to a modified preferred embodiment of the present invention.

Further, the place where the concave portion is provided is not limited to the upper surface of the base plate. As shown in the modified preferred embodiment of the present invention of FIG. 12, in a case where a head portion 417H is disposed lower than a flange portion 415H, a concave portion 418H is preferably disposed on a lower surface of a base plate 21H. Further, in a case where the head portion is provided in the base body portion, the concave portion is also provided in the base body portion. More specifically, in a case where the head portion is provided on the upper surface of the base body portion, the concave portion is provided on the upper surface of the base body portion. In a case where the head portion is provided on the lower surface of the base body portion, the concave portion is provided on the lower surface of the base body portion.

The base plate according to the preferred embodiments of the present invention and modifications thereof may be applied to various disk drive apparatuses. The disk drive apparatus may rotate a disk other than a magnetic disk, for example, an optical disc. Here, according to the preferred embodiments of the present invention and modifications thereof, it is possible to reduce the size of the disk drive apparatus in the axial direction. Accordingly, the preferred embodiments of the present invention and modifications thereof are particularly useful in a base plate used in a disk drive apparatus for a thin notebook PC or a tablet PC. Specifically, preferred embodiments of the present invention are particularly useful in a base plate for use in a disk drive apparatus of a type of 2.5" and a thickness of about 7 mm or less. The disk drive apparatus of the thickness of about 7 mm or less includes, for example, a disk drive apparatus of a thickness of about 7 mm, a disk drive apparatus of a thickness of about 5 mm, and a disk drive apparatus of a thickness of about 3 mm.

Further, in the above preferred embodiments and modifications thereof, a so-called outer rotor motor in which a magnet is preferably disposed outside a stator in the radial direction has been described. However, the motor according to the preferred embodiments of the present invention and modifications thereof may also be a so-called inner rotor motor in which a magnet is disposed inside a stator in the radial direction.

Further, in the above preferred embodiments of the present invention and modifications thereof, a so-called shaft rotating motor in which a sleeve belongs to a stationary portion and a shaft belongs to a rotating portion has been described. However, the motor according to the present invention may be a so-called fixed shaft motor in which a shaft belongs to a stationary portion and a sleeve belongs to a rotating portion. In the case of the fixed shaft motor, the shaft may be fixed to a bearing mounting portion.

Further, the shapes of detailed portions and elements of respective members may be different from the shapes shown in the respective drawings of the description. For example, the plastic deforming portion may be disposed farther radially outward than an outer end portion of the hub.

Features of the above-described preferred embodiments and the modifications thereof may be combined appropriately as long as no conflict arises.

The preferred embodiments of the present invention and modifications thereof may be applied to a base plate, a base unit, a motor, and a disk drive apparatus.

While preferred embodiments of the present invention and modifications thereof have been described above, it is to be understood that variations and further modifications will be apparent to those skilled in the art without departing from the scope and spirit of the present invention. The scope of the present invention, therefore, is to be determined solely by the following claims.

What is claimed is:

1. A base plate of a disk drive apparatus which rotates a disk centered on a central axis which extends vertically, the base plate comprising:
 a motor base which is disposed around the central axis and is made of a metallic material of a first type; and
 a base body portion which extends radially outward of the motor base and is made of a metallic material of a second type; wherein
 a Young's modulus of the metallic material of the first type is larger than a Young's modulus of the metallic material of the second type;
 the motor base includes:
  a bearing mounting portion of a cylindrical or an approximately cylindrical shape which axially extends around the central axis;
  a bottom plate portion which extends radially outward from a lower portion of the bearing mounting portion;
  a wall portion which extends upward from an outer end portion of the bottom plate portion;
  a flange portion which extends radially outward from one of an upper end and a lower end of the wall portion; and
  a plastic deforming portion which extends radially outward from the other of the upper end and the lower end of the wall portion;
 the base body portion includes an inner end portion which is in contact with an outer circumferential surface of the wall portion; and
 the flange portion and the plastic deforming portion are respectively in contact with at least a portion of each of both axial end surfaces of the inner end portion of the base body portion.

2. The base plate according to claim 1, wherein a surface of the base body portion includes:
 a coated surface which is coated by an insulating layer; and
 an exposed surface which is exposed from the insulating layer; and
 at least both axial end surfaces of the inner end portion of the base body portion are provided as the exposed surface.

3. The base plate according to claim 1, wherein
the base body portion includes a cut out which extends radially outward from the inner end portion; and
at least a portion of the plastic deforming portion is disposed inside the cut out.

4. The base plate according to claim 1, wherein
the plastic deforming portion is disposed higher than the flange portion;
the base body portion includes an outer upper surface disposed farther radially outward than the plastic deforming portion; and
an upper surface of the plastic deforming portion is disposed lower than the outer upper surface.

5. The base plate according to claim 1, wherein the plastic deforming portion is disposed lower than the flange portion.

6. The base plate according to claim 1, further comprising a sealing material which is interposed over an entire circumference between the motor base and the base body portion.

7. The base plate according to claim 1, further comprising a sealing material which is disposed in a boundary portion between a lower surface of the motor base and a lower surface of the base body portion.

8. The base plate according to claim 1, wherein the plastic deforming portion is continuously connected in an annular shape.

9. The base plate according to claim 1, further comprising a plurality of the plastic deforming portions which are arranged in a circumferential direction.

10. A base unit comprising:
the base plate according to claim 1; and
a stator which is disposed above the base plate; wherein
the motor base includes a drawing hole which penetrates through the bottom plate portion; and
a conducting wire which extends from the stator reaches a lower surface of the base plate through the drawing hole.

11. The base unit according to claim 10, wherein
the stator includes a coil; and
an outer end portion of the motor base is disposed farther radially outward than an outer end portion of the coil.

12. A motor for use in a disk drive apparatus of a type of 2.5" and a thickness of about 7 mm or less, the motor comprising:
the base unit according to claim 10;
a bearing mechanism which is accommodated inside the bearing mounting portion; and
a rotating portion which is supported by the bearing mechanism and rotates centered on the central axis.

13. A disk drive apparatus of a type of 2.5" and a thickness of about 7 mm or less, the disk drive apparatus comprising:
the motor according to claim 12;
a cover which is arranged to cover an upper portion of the base unit; and
at least one disk which is held by the rotating portion.

14. A base plate of a disk drive apparatus which rotates a disk centered on a central axis which extends vertically, the base plate comprising:
a motor base which is disposed around the central axis and is made of a metallic material of a first type; and
a base body portion which extends radially outward of the motor base and is made of a metallic material of a second type; wherein
a Young's modulus of the metallic material of the first type is larger than a Young's modulus of the metallic material of the second type;
the motor base includes:
a bearing mounting portion of a cylindrical or an approximately cylindrical shape which axially extends around the central axis; and
a bottom plate portion which extends radially outward from a lower portion of the bearing mounting portion,
the base body portion includes:
an edge portion which is radially in contact with an outer end portion of the motor base;
a flange portion which extends radially inward from one of an upper end and a lower end of the edge portion; and
a plastic deforming portion which extends radially inward from the other of the upper end and the lower end of the edge portion; and
the flange portion and the plastic deforming portion are respectively in contact with at least a portion of both axial end surfaces of the outer end portion of the motor base.

15. The base plate according to claim 14, wherein a surface of the base body portion includes:
a coated surface which is coated by an insulating layer; and
an exposed surface which is exposed from the insulating layer; and
at least a surface of the plastic deforming portion is provided as the exposed surface.

16. The base plate according to claim 14, wherein
the motor base includes a cut out which extends radially inward from the outer end portion; and
at least a portion of the plastic deforming portion is disposed inside the cut out.

17. The base plate according to claim 14, wherein
the plastic deforming portion is disposed higher than the flange portion;
the base body portion includes an outer upper surface which is disposed farther radially outward than the plastic deforming portion; and
an upper surface of the plastic deforming portion is disposed lower than the outer upper surface.

18. The base plate according to claim 14, wherein the plastic deforming portion is disposed lower than the flange portion.

19. The base plate according to claim 14, further comprising a sealing material which is interposed over an entire circumference between the motor base and the base body portion.

20. The base plate according to claim 14, further comprising a sealing material which is disposed in a boundary portion between a lower surface of the motor base and a lower surface of the base body portion.

21. The base plate according to claim 14, wherein the plastic deforming portion is continuously connected in an annular shape.

22. The base plate according to claim 14, further comprising a plurality of the plastic deforming portions which are arranged in a circumferential direction.

23. A base unit comprising:
the base plate according to claim 14; and
a stator which is disposed above the base plate; wherein
the motor base includes a drawing hole which penetrates through the bottom plate portion; and
a conducting wire which extends from the stator reaches a lower surface of the base plate through the drawing hole.

24. The base unit according to claim 23, wherein
the stator includes a coil; and
an outer end portion of the motor base is disposed radially outside an outer end portion of the coil.

25. A motor for use in a disk drive apparatus of a type of 2.5" and a thickness of about 7 mm or less, the motor comprising:
- the base unit according to claim 23;
- a bearing mechanism which is accommodated inside the bearing mounting portion; and
- a rotating portion which is supported by the bearing mechanism and rotates centered on the central axis.

26. A disk drive apparatus of a type of 2.5" and a thickness of about 7 mm or less, the disk drive apparatus comprising:
- the motor according to claim 25;
- a cover which is arranged to cover an upper portion of the base unit; and
- at least one disk which is held by the rotating portion.

* * * * *